United States Patent
Shibata et al.

(10) Patent No.: US 12,406,380 B2
(45) Date of Patent: Sep. 2, 2025

(54) IMAGE PROCESSING APPARATUS, IMAGE PROCESSING SYSTEM, IMAGE PROCESSING METHOD, AND NON-TRANSITORY COMPUTER-READABLE MEDIUM STORING IMAGE PROCESSING PROGRAM THEREIN

(71) Applicant: NEC Corporation, Tokyo (JP)

(72) Inventors: Takashi Shibata, Tokyo (JP); Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 17/800,255

(22) PCT Filed: Mar. 12, 2020

(86) PCT No.: PCT/JP2020/010853
§ 371 (c)(1),
(2) Date: Aug. 17, 2022

(87) PCT Pub. No.: WO2021/181612
PCT Pub. Date: Sep. 16, 2021

(65) Prior Publication Data
US 2023/0107372 A1    Apr. 6, 2023

(51) Int. Cl.
G06T 7/246    (2017.01)
G06V 10/62    (2022.01)
G06V 10/776    (2022.01)

(52) U.S. Cl.
CPC ............ G06T 7/248 (2017.01); G06V 10/62 (2022.01); G06V 10/776 (2022.01); *G06T 2207/10016* (2013.01); *G06T 2207/30241* (2013.01)

(58) Field of Classification Search
None
See application file for complete search history.

(56) References Cited

U.S. PATENT DOCUMENTS

2005/0090978 A1*  4/2005  Bathory ............... G08G 5/0082
                                                     701/3
2016/0140394 A1*  5/2016  Lee ........................ G06V 20/40
                                                     382/103
(Continued)

FOREIGN PATENT DOCUMENTS

JP    2003-141505 A    5/2003
JP    2013-092878 A    6/2013
(Continued)

OTHER PUBLICATIONS

International Search Report for PCT Application No. PCT/JP2020/010853, mailed on Jun. 23, 2020.
(Continued)

*Primary Examiner* — Vikkram Bali (57) ABSTRACT

According to the present disclosure, it is an object to provide, in particular, an image processing apparatus, an image processing system, an image processing method, and a non-transitory computer-readable medium storing an image processing program therein, capable of tracking an object in a video with high accuracy. An image processing apparatus according to the present disclosure includes: image feature calculation means for outputting an image feature of an object using a time-series image of the object; object identification means for outputting an identification result obtained by identifying an object using the image feature and a tracking result of the object; kinetic model selection means for selecting an appropriate kinetic model from a plurality of kinetic models based on the identification result and the tracking result; and object tracking means for tracking the object in time series and calculating the tracking result, from the identified object.

5 Claims, 7 Drawing Sheets

(56) References Cited

U.S. PATENT DOCUMENTS

2019/0020056 A1* 1/2019 Nagai .............. H01M 10/0525
2019/0050994 A1   2/2019 Fukagai

FOREIGN PATENT DOCUMENTS

| JP | 2019-036009 A | 3/2019 | | |
| JP | 2019-185210 A | 10/2019 | | |
| WO | WO-2012045317 A1 * | 4/2012 | ......... | G06K 9/00711 |
| WO | 2016/114134 A1 | 7/2016 | | |

OTHER PUBLICATIONS

Sam Hare et al. "Struck: Structured output tracking with kernels", IEEE transactions on pattern analysis and machine intelligence, Oct. 2016, pp. 2096-2109, vol. 38, No. 10.

Wei Zhong, Huchuan Lu, and Ming-Hsuan Yang, "Robust object tracking via sparsily-based collaborative model." 2012 IEEE Conference on Computer vision and pattern recognition. IEEE,pp. 1838-1845, 2012.

Bo Li et al. "High performance visual tracking with siamese region proposal network." Proceedings of the IEEE Conference on Computer Vision and Pattern Recognition. pp. 8971-8980, 2018.

Takashi Shibata, Masayuki Tanaka, and Masatoshi Okutomi, "Accurate joint geometric camera calibration of visible and far-infrared cameras." IS&T International Symposium on Electronic Imaging 2017, 2017, pp. 7-13.

Takashi Shibata, Masayuki Tanaka, and Masatoshi Okutomi. "Unified Image Fusion Framework With Learning-Based Application-Adaptive Importance Measure." IEEE Transactions on Computational Imaging, Mar. 2019, vol. 5, No. 1, pp. 82-96.

David G. Lowe, "Distinctive image features from scale-invariant keypoints." International Journal of Computer Vision 60.2 (2004): 91-110, pp. 1-28.

JP Office Action for JP Application No. 2022-507120, mailed on Apr. 25, 2023 with English Translation.

* cited by examiner

OBJECT POSITION PREDICTION MEANS PREDICTS MOVEMENT OF t-TH FRAME BASED ON DETECTION POSITION AND KINETIC MODEL IN (t-1)-TH FRAME. MOREOVER, OBJECT POSITION PREDICTION MEANS INVERSE-PREDICTS MOVEMENT OF (t-1)-TH FRAME BASED ON DETECTION POSITION AND KINETIC MODEL IN t-TH FRAME.

IMAGE PROCESSING APPARATUS, IMAGE PROCESSING SYSTEM, IMAGE PROCESSING METHOD, AND NON-TRANSITORY COMPUTER-READABLE MEDIUM STORING IMAGE PROCESSING PROGRAM THEREIN

This application is a National Stage Entry of PCT/JP2020/010853 filed on Mar. 12, 2020, the contents of all of which are incorporated herein by reference, in their entirety.

TECHNICAL FIELD

The present invention relates to an image processing apparatus, an image processing system, an image processing method, and a non-transitory computer-readable medium storing an image processing program therein. In particular, the present invention relates to an image processing apparatus, an image processing system, an image processing method, and a non-transitory computer-readable medium storing an image processing program therein, capable of tracking an object in a video with high accuracy.

BACKGROUND ART

Techniques for tracking objects in video are expected to be applied in various industries such as defect inspection and video monitoring. In particular, in the field of video monitoring, it is important to track suspicious objects and suspicious persons for a long period of time, and for this reason, a method robust against loss of sight or transfer is required. Long-term tracking is also important in tracking objects taken with radar. Tracking techniques have been developed for a long time, and among them, the methods such as Struck and TLD (Tracking Learning Detection) described in Non Patent Literatures 1 and 2 are known as methods robust against loss of sight or transfer. In the tracking techniques described in Non Patent Literatures 1 and 2, the expressive power of visible features used for tracking is small, and the tracking accuracy is limited.

On the other hand, in recent years, with the development of deep learning, it has become possible to acquire more abundant image features, and the accuracy of detection and recognition has improved. Non Patent Literature 3 discloses a tracking method (tracking technique) incorporating a network architecture of a Siamese structure (twin structure) utilizing deep learning in a form utilizing these advantages.

CITATION LIST

Non Patent Literature

Non Patent Literature 1: Hare, Sam, et al. "Struck: Structured output tracking with kernels." IEEE transactions on pattern analysis and machine intelligence 38.10 (2015): 2096-2109.

Non Patent Literature 2: Zhong, Wei, Huchuan Lu, and Ming-Hsuan Yang. "Robust object tracking via sparsity-based collaborative model." 2012 IEEE Conference on Computer vision and pattern recognition. IEEE, 2012.

Non Patent Literature 3: Li, Bo, et al. "High performance visual tracking with siamese region proposal network." Proceedings of the IEEE Conference on Computer Vision and Pattern Recognition. 2018.

Non Patent Literature 4: Shibata, Takashi, Masayuki Tanaka, and Masatoshi Okutomi. "Accurate joint geometric camera calibration of visible and far-infrared cameras." Electronic Imaging 2017.11 (2017): 7-13.

Non Patent Literature 5: Shibata, Takashi, Masayuki Tanaka, and Masatoshi Okutomi. "Unified Image Fusion Framework With Learning-Based Application-Adaptive Importance Measure." IEEE Transactions on Computational Imaging 5.1 (2018): 82-96.

Non Patent Literature 6: Lowe, David G. "Distinctive image features from scale-invariant keypoints." International journal of computer vision 60.2 (2004): 91-110.

SUMMARY OF INVENTION

Technical Problem

The tracking method described in Non Patent Literature 3 can perform tracking with high accuracy by utilizing abundant image features. However, the tracking method described in Non Patent Literature 3 performs tracking using only the image features of each frame, and is vulnerable to loss of sight or transfer. There is a problem that long-term tracking, especially tracking of an object in a video with high accuracy is difficult. Specifically, this is due to deformation, shielding, passing, or the like of a tracking target.

An object of the present disclosure is to solve the above-mentioned problems, and is to provide an image processing apparatus, an image processing system, an image processing method, and a non-transitory computer-readable medium storing an image processing program therein, capable of tracking an object in a video with high accuracy by tracking an object robustly against such transfer or loss of sight.

Solution to Problem

An image processing apparatus according to the present disclosure includes: image feature calculation means for outputting an image feature of an object using a time-series image of the object; object identification means for outputting an identification result obtained by identifying the object using the image feature and a tracking result of the object; kinetic model selection means for selecting an appropriate kinetic model from a plurality of kinetic models based on the identification result and the tracking result; and object tracking means for tracking the object in time series and calculates the tracking result, from the identified object.

An image processing system according to the present disclosure includes: a time-series image input/output apparatus configured to output a time-series image of an object; an image processing apparatus configured to receive the time-series image of the object; a kinetic model dictionary configured to store a kinetic model for each object and object information in association with each other; an identification result output apparatus configured to output an identification result of the object; and a tracking result output apparatus configured to output a tracking result of the object, in which the image processing apparatus includes: image feature calculation means for outputting an image feature of the object using the time-series image of the object; object identification means for outputting the identification result obtained by identifying the object using the image feature and the tracking result of the object; kinetic model selection means for selecting an appropriate kinetic model from a plurality of the kinetic models based on the identification result and the tracking result; and object tracking means for tracking the object in time series and calculates the tracking result, from the identified object.

An image processing method according to the present disclosure includes: outputting an image feature of an object using a time-series image of the object; outputting an identification result obtained by identifying the object using the image feature and a tracking result of the object; selecting an appropriate kinetic model from a plurality of kinetic models based on the identification result and the tracking result; and tracking the object in time series and calculating the tracking result, from the identified object.

A non-transitory computer-readable medium according to the present disclosure stores an image processing program therein, the program causing a computer to execute: outputting an image feature of an object using a time-series image of the object; outputting an identification result obtained by identifying the object using the image feature and a tracking result of the object; selecting an appropriate kinetic model from a plurality of kinetic models based on the identification result and the tracking result; and tracking the object in time series and calculating the tracking result, from the identified object.

Advantageous Effects of Invention

According to the present disclosure, an image processing apparatus, an image processing system, an image processing method, and a non-transitory computer-readable medium storing an image processing program therein, capable of tracking an object in a video with high accuracy by tracking an object robustly against transfer or loss of sight.

EXAMPLE EMBODIMENT

Hereinafter, example embodiments of the present invention will be described with reference to the drawings. In each figure, the same or corresponding elements are designated by the same reference numerals, and duplicate description will be omitted as necessary for the sake of clarification of the description.

Example Embodiment

<Configuration>
The configuration of an example embodiment will be described.

Figure 1:
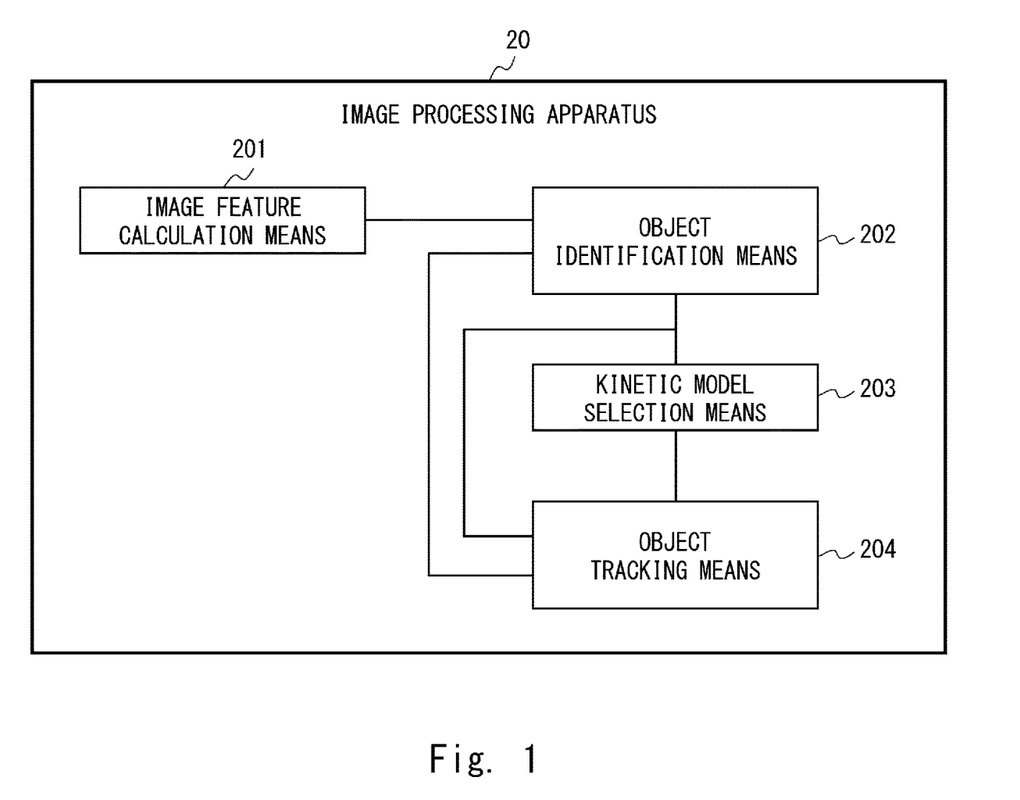
FIG. 1 is a block diagram illustrating a configuration of an image processing apparatus according to an example embodiment.

FIG. 1 is a block diagram illustrating a configuration of an image processing apparatus according to an example embodiment.

Figure 2:
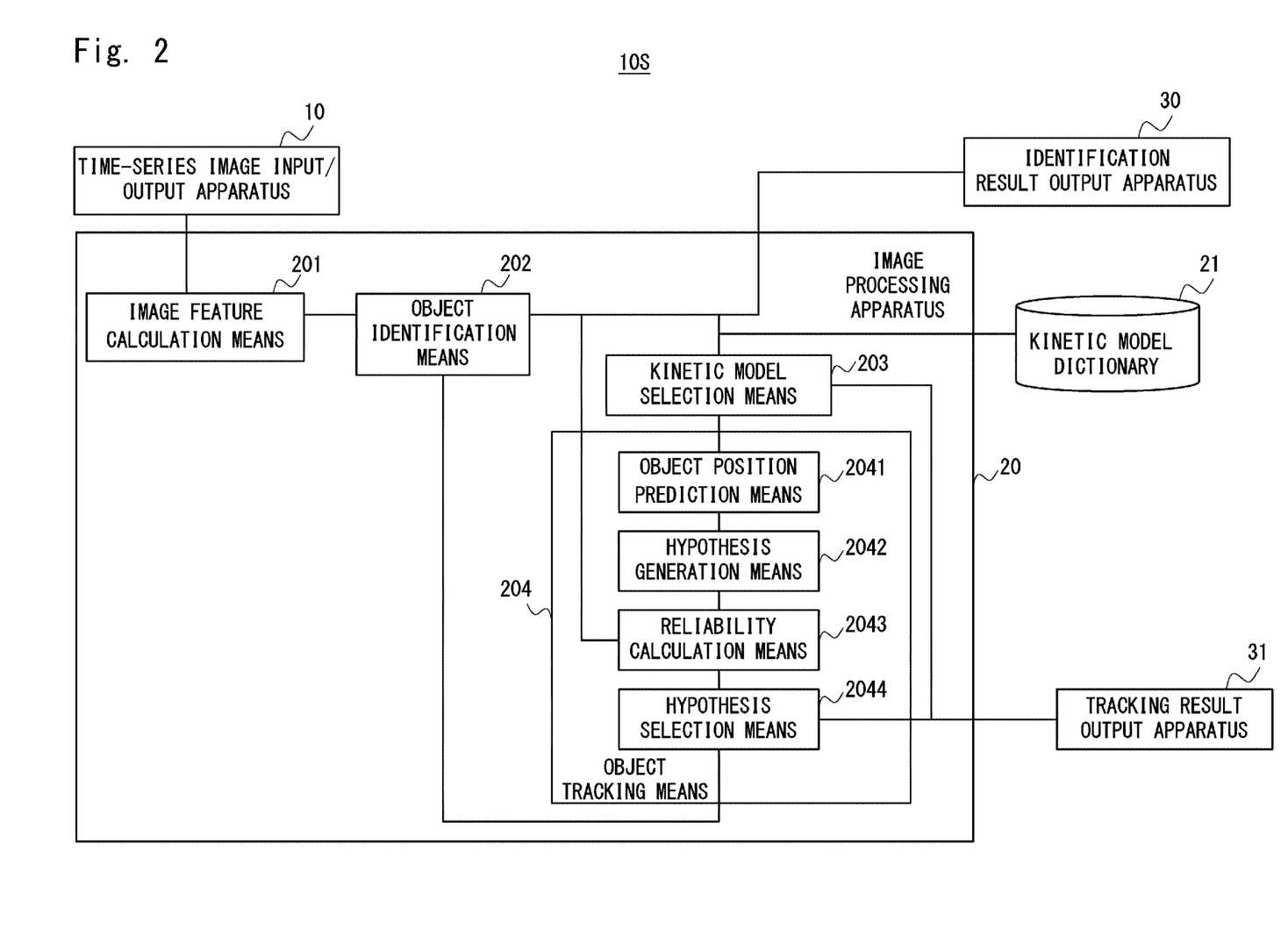
FIG. 2 is a block diagram illustrating a configuration of an image processing system according to an example embodiment.

FIG. 2 is a block diagram illustrating the configuration of the image processing system according to the example embodiment.

As shown in FIGS. 1 and 2, an image processing system 10S according to the example embodiment includes a time-series image input/output apparatus 10, an image processing apparatus 20, a kinetic model dictionary 21, an identification result output apparatus 30, and a tracking result output apparatus 31. The image processing apparatus 20 can be realized by a computer or the like operated by program control. The image processing apparatus may also be referred to as a central processing unit, a processor, or a data processing apparatus.

The image processing apparatus 20 includes image feature calculation means 201, object identification means 202, kinetic model selection means 203, and object tracking means 204. The object tracking means 204 includes object position prediction means 2041, hypothesis generation means 2042, reliability calculation means 2043, and hypothesis selection means 2044.

The time-series image input/output apparatus 10 of the image processing system 10S acquires a time-series image (moving image) and outputs the acquired time-series image to the image processing apparatus 20. The time-series image may be, for example, an image taken by a video camera or the like, or may be a sequence of images taken at regular intervals. The time-series image input/output apparatus 10 outputs, for example, one or more images or measured values acquired by a camera, a sensor for measurement, or the like to the image processing apparatus 20. The image may be, for example, a two-dimensional image. The two-dimensional image or the measured value is not limited to a visible image. The two-dimensional image or the measured value may be, for example, an image acquired from a sensor. Specifically, a temperature image, a depth image, or the like may be used. The time-series image input/output apparatus 10 stores the acquired two-dimensional image or the measured value in a memory (not shown) or the like.

The two-dimensional image is not limited to a visible image acquired from a camera and a sensor image acquired from a sensor. The two-dimensional image acquired by the time-series image input/output apparatus 10 may be for example, a processing result in the middle of deep learning acquired as a multi-channel image. Alternatively, vector data (velocity field, density field, or the like) calculated using numerical simulation or the like may be acquired as a multi-channel image. The time-series image input/output apparatus 10 records the acquired image or measured value in a memory (not shown) or the like.

The image input to the time-series image input/output apparatus 10 does not have to be an image obtained using a single camera. For example, a plurality of modal images such as a visible image and a far-infrared image may be input as a moving image. In that case, the positions of these images may be aligned using, for example, the method of Non Patent Literature 4. Alternatively, one image may be combined from these images using the method of Non Patent Literature 5.

The identification result output apparatus 30 outputs the identification result of the object identified by the object identification means 202 described later. As the output format, the output result may be displayed on a display or may be output (stored) to a recording apparatus such as a memory.

The tracking result output apparatus 31 outputs the tracking result of the object obtained by the hypothesis selection means 2044 described later. As the output format, the output result may be displayed on a display or may be output (stored) to a recording apparatus such as a memory.

The image feature calculation means 201 extracts image features from an image sequence (time-series image) input from the time-series image input/output apparatus 10. The image feature calculation means 201 further outputs a region in which an object is likely to exist from the image feature as the position of an object candidate.

Specifically, the image feature calculation means 201 may extract image features using a neural network having a twin structure, for example, as in the method described in Non Patent Literature 3. The image feature calculation means 201 may not perform feature extraction using a neural network when extracting image features, but may extract image features using a method using a gradient histogram, for example, as in the method described in Non Patent Literature 6. The image feature calculation means 201 detects the positions where a tracking target object is likely to currently exist from these image features, and outputs the position coordinates thereof.

The method for extracting image features in the image feature calculation means 201 is not limited to this. The image feature calculation means 201 may extract image features from different time-series images, for example, and may extract image features using both an image feature extraction method using a neural network and an image feature extraction method using a gradient histogram.

The object identification means 202 identifies the tracking target object using the image features extracted by the image feature calculation means 201 and the tracking result obtained by the hypothesis selection means 2044 described later. The identification of an object as used herein may refer to identifying a type of object such as a person, a car, a dog, or a bicycle. Alternatively, it may refer to identifying attribute information such as red clothing, blue bag, age, and gender.

The type of a minute object such as a bubble or a foreign substance in a liquid may be referred to as an object type. Alternatively, a state of movement such as running or stopping may be referred to as an object type.

The object identification means 202 identifies the types and attribute information of these objects using the image features and tracking result. Hereinafter, the types and attribute information of these objects will be referred to as object information. In addition, the term that separates each category is referred to as a class.

Here, specifically, a method of acquiring object information using image features and tracking results will be described.

Regarding image features, for example, if the extracted image features are D-dimensional, in order to acquire object information from the D-dimensional features, for example, object information may be acquired using an identification method such as a support vector machine or a random forest. Alternatively, the object information may be acquired using a fully-connected neural network. In general, in an identification method such as a support vector machine or a random forest, or an identification method using a neural network, a reliability score (or probability) (associated with) of an object identification result can be obtained. These reliability scores are hereinafter referred to as image feature reliability scores.

On the other hand, as a method of acquiring object information from the tracking result, the movement of the tracking result may be vectorized as in the image feature, and these vectors may be used as features. For example, object information may be acquired using an identification method such as a support vector machine or a random forest. Alternatively, the object information may be acquired using a fully-connected neural network. In general, in an identification method such as a support vector machine or a random forest, or an identification method using a neural network, the reliability associated with the identification result can be obtained. These reliabilities are hereinafter referred to as tracking result reliabilities.

The object identification means 202 integrates the object information obtained from these image features and the object information obtained from the tracking result, and acquires object information. Here, the integration means, for example, adding or accumulating the image feature reliability and the tracking result reliability, and outputs the class having the highest integrated score as the object information.

The kinetic model dictionary 21 stores kinetic models for each piece of object information of a plurality of objects. For example, when the object information is on a bubble or a foreign substance in a liquid, the object information includes kinetic characteristics that the bubble is above the liquid and the foreign substance sinks downward. A kinetic model that models such kinetic characteristics is stored in the kinetic model dictionary 21. For example, when the object of the object information is a car or a person, a kinetic model that models kinetic characteristics that a person moves at a low speed, a car moves at a high speed, or both are stationary is stored in the kinetic model dictionary 21. The kinetic model dictionary 21 may represent the object information and the movement state (kinetic characteristics) of each kinetic model as feature vectors, and may store these feature vectors and the kinetic models in association with each other.

The kinetic model selection means 203 selects an appropriate kinetic model from a plurality of kinetic models stored in the kinetic model dictionary based on the (object) identification result obtained by the object identification means 202 and the tracking result obtained by the hypothesis selection means 2044. Specifically, the kinetic model selection means 203 calculates the movement state obtained based on the object information identified by the object identification means 202 and the tracking result selected by the hypothesis selection means 2044 as a feature vector. The kinetic model selection means 203 may select a kinetic model associated with a feature vector in the kinetic model dictionary 21, which is the closest distance to the feature vector as an appropriate kinetic model.

The object tracking means 204 tracks an object in time series and calculates the tracking result of the object, from the identified object.

The object position prediction means 2041 predicts an object position (position of an object) in a target frame from a detection position of an object in a previous frame of the target frame using an appropriate kinetic model selected by the kinetic model selection means 203.

Figure 3:
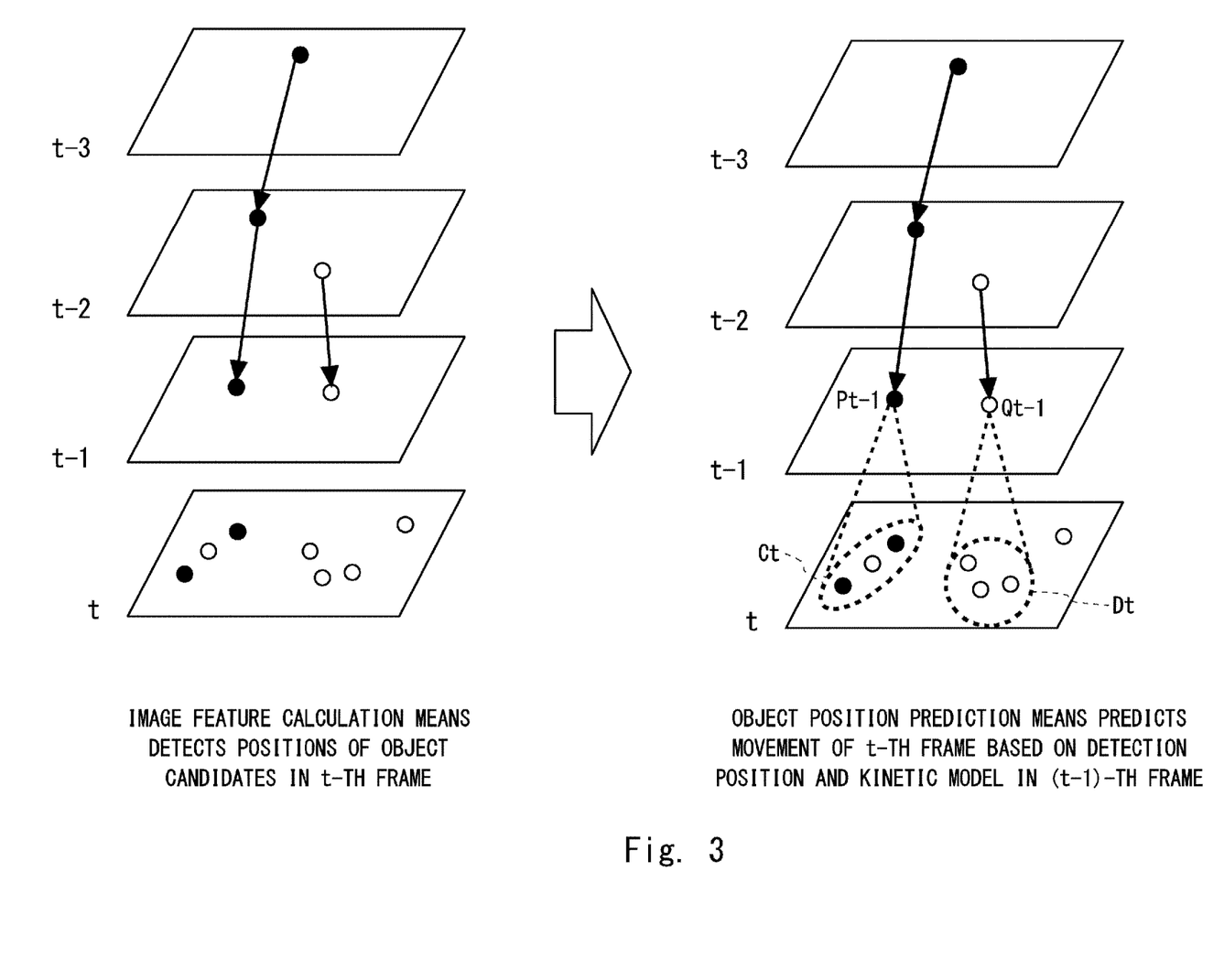
FIG. 3 is a schematic diagram illustrating the operation of object position prediction means according to an example embodiment.

Here, the operation of the object position prediction means 2041 will be described in detail.

FIG. 3 is a schematic diagram illustrating the operation of the object position prediction means according to the example embodiment.

Figure 4:
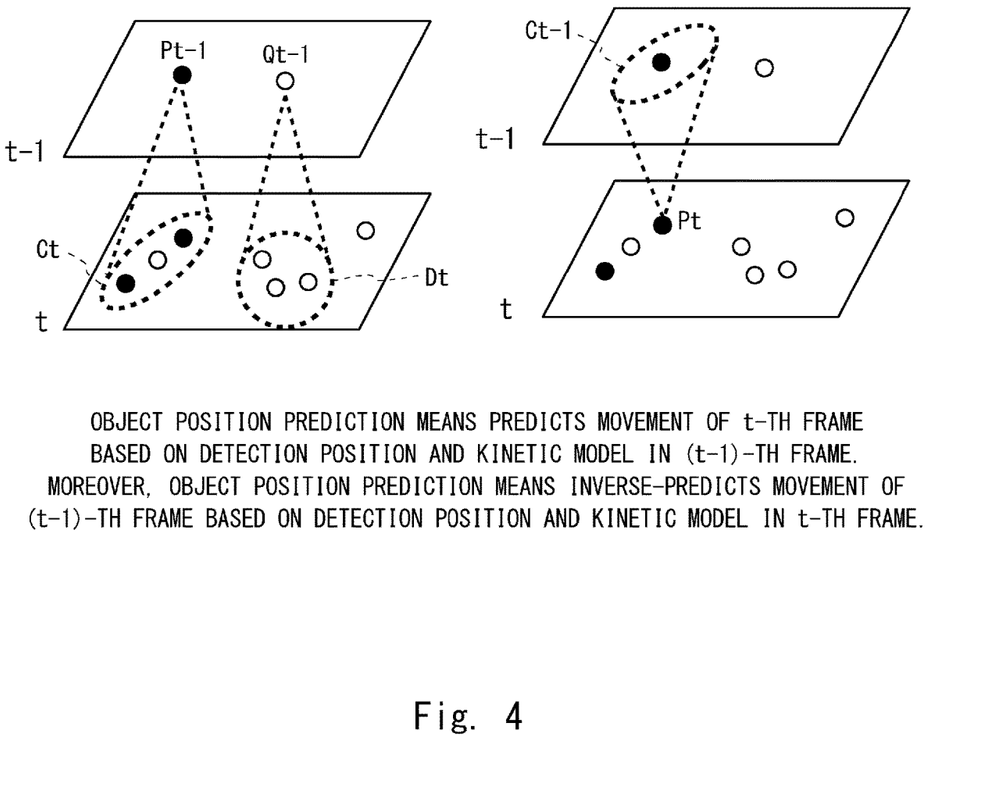
FIG. 4 is a schematic diagram illustrating the operation of object position prediction means according to an example embodiment.

FIG. 4 is a schematic diagram illustrating the operation of the object position prediction means according to the example embodiment.

FIG. 3 shows the (t−3)-th frame, the (t−2)-th frame, the (t−1)-th frame, and the t-th frame, and the arrows indicate after the tracking.

The figure on the left side of FIG. 3 shows a state in which the position of the object candidate in the t-th frame is detected by the image feature calculation means 201, and the figure on the right side of FIG. 3 shows a state in which the movement of the t-th frame is predicted based on the detection position of the (t−1)-th frame and the kinetic model by the object position prediction means 2041.

The black dots and white dots shown in FIG. 3 indicate different types of object information.

FIG. 3 shows a state in which, in the t-th frame, as a result of the image feature calculation means 201 calculating the image features, a plurality of (seven in total) object candidates are detected as tracking candidates.

As shown in the figure on the right side of FIG. 3, the object position prediction means 2041 predicts the position of the t-th object using the kinetic model selected in the (t−1)-th frame. Specifically, for example, it is predicted from the moving object model that a black point Pt-1 in the (t−1)-th frame has a high probability of being present somewhere in an elliptical region Ct in the t-th frame. On the other hand, it is predicted from the moving object model that a white point Qt-1 in the (t−1)-th frame has a high probability of being present somewhere in a circular region Dt in the t-th frame.

The object position prediction means 2041 is not limited to the above operation. The object position prediction means 2041 may predict the position of the object in a previous frame of a target frame from the position of the object in the target frame.

For example, as shown in FIG. 4, the object position prediction means 2041 may predict the position of the (t−1)-th object using the kinetic model selected in the t-th frame as shown in the figure on the right side of FIG. 4 (the movement of the (t−1)-th frame may be predicted from the t-th detection position and the kinetic model). That is, it is predicted from the moving object model that the black point Pt in the t-th frame has a high probability of being present somewhere in the elliptical region Ct-1 in the (t−1)-th frame. Such an operation may be performed for all the t-th frames.

Further, the object position prediction means 2041 is not limited to the above operation. For example, the object position prediction means 2041 may predict the position of the (t−1)-th object using the kinetic model selected in the t-th frame, further predict the position of the t-th object using the kinetic model selected in the (t−1)-th frame, and integrate the prediction results to predict the object position.

Figure 5:
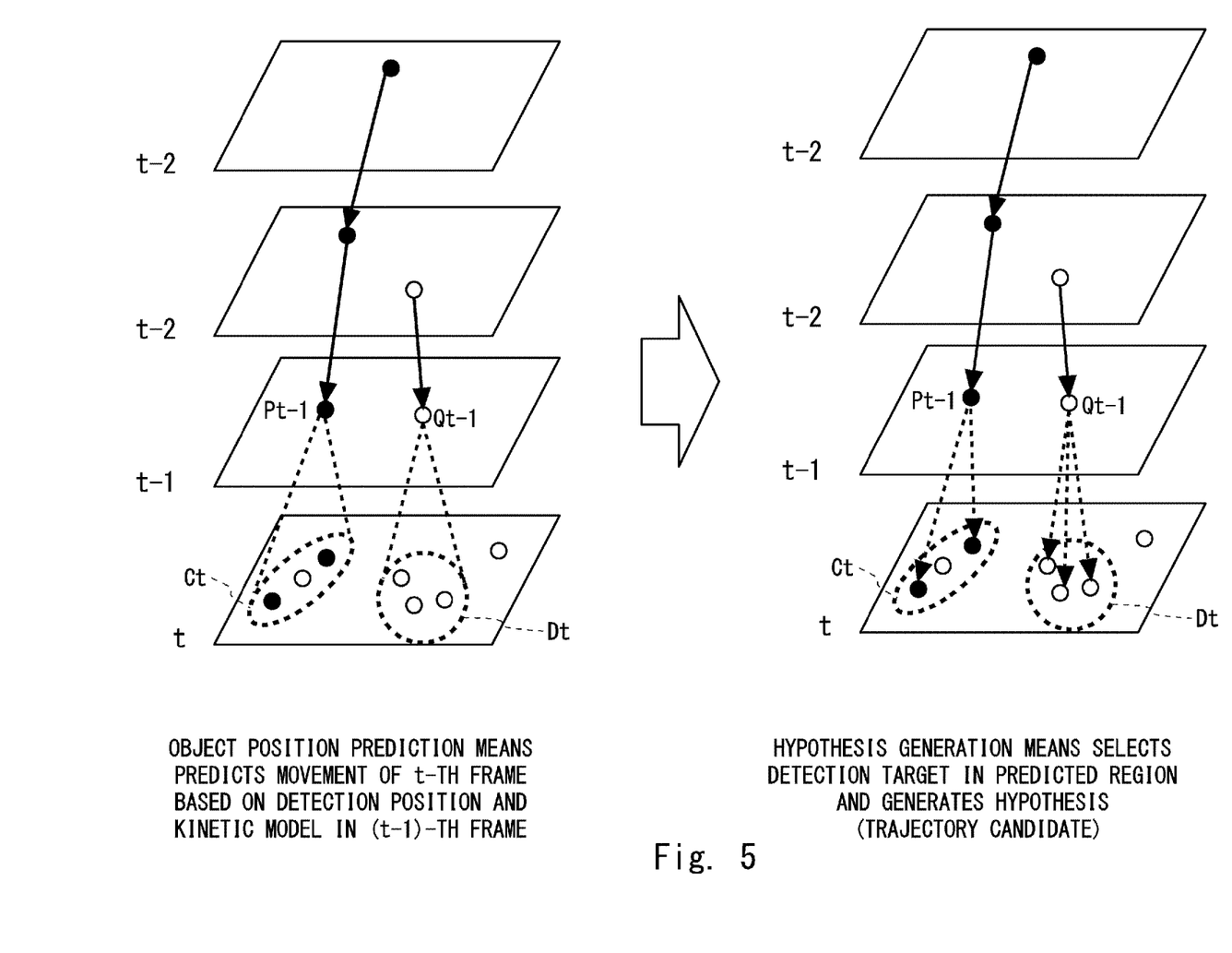
FIG. 5 is a schematic diagram illustrating the operation of hypothesis generation means according to an example embodiment.

The hypothesis generation means 2042 generates a candidate for the trajectory of the object as a hypothesis from the object position predicted by the object position prediction means 2041.

Here, the operation of the hypothesis generation means 2042 will be described in detail.

FIG. 5 is a schematic diagram illustrating the operation of the hypothesis generation means according to the example embodiment.

The figure on the left side of FIG. 5 shows a result of prediction of the movement of the object detected in the t-th frame (specifically, the region Ct and the region Dt in the t-th frame) using the kinetic model selected in the (t−1)-th frame. Here, the region Ct and the region Dt are regions calculated as having a high probability that the tracking target exists in the t-th frame as a result of using the kinetic model.

The hypothesis generation means 2042 selects points (detection targets) that are within the region Ct that is calculated and predicted to have a high probability that the above-mentioned tracking target exists, and are considered to be an object of the same type, and generates a hypothesis (candidates for trajectory) by connecting the points as candidates for trajectory. Specifically, as shown in the figure on the right side of FIG. 5, in the black point Pt-1 in the (t−1)-th frame, two black points in the region Ct in the t-th frame are connected as candidates for the trajectory. Further, in the white point Qt-1 in the (t−1)-th frame, three white points in the region Dt in the t-th frame are connected as candidates for the trajectory.

It should be noted that the black point Pt in the (t−1)-th frame is connected to only the same type of detection object (that is, the black point) in the t-th frame. Therefore, even if a white point exists in the region where the probability that the tracking target exists in the t-th frame is considered to be high, the white point is not connected to the white point as a candidate for the tracking target trajectory.

The reliability calculation means 2043 calculates the reliability of the object identification result as the object reliability, and calculates the reliability corresponding to the distance between the position of the object predicted by the object position prediction means 2041 and the detection position of the object in the target frame as the movement reliability. The reliability calculation means 2043 calculates the reliability of each hypothesis by integrating the object reliability and the movement reliability.

Specifically, the object reliability refers to a value based on the reliability score (or probability) associated with the identification result output by the object identification means 202. That is, a monotonously increasing function for these image feature reliability scores is used as the object reliability.

The movement reliability is calculated as a quantity such that the smaller the distance between the region (range) of the object position predicted by the object position prediction means 2041 and the detection position of the prediction destination frame, the larger the value of the movement reliability. For example, the distance between the region (range) of the object position predicted by the object position prediction means 2041 and the detection position of the prediction destination frame may be calculated, and the movement reliability may be defined as a monotonously decreasing function of this distance. Finally, the reliability calculation means 2043 integrates these object reliabilities and movement reliabilities to calculate the reliability.

Figure 6:
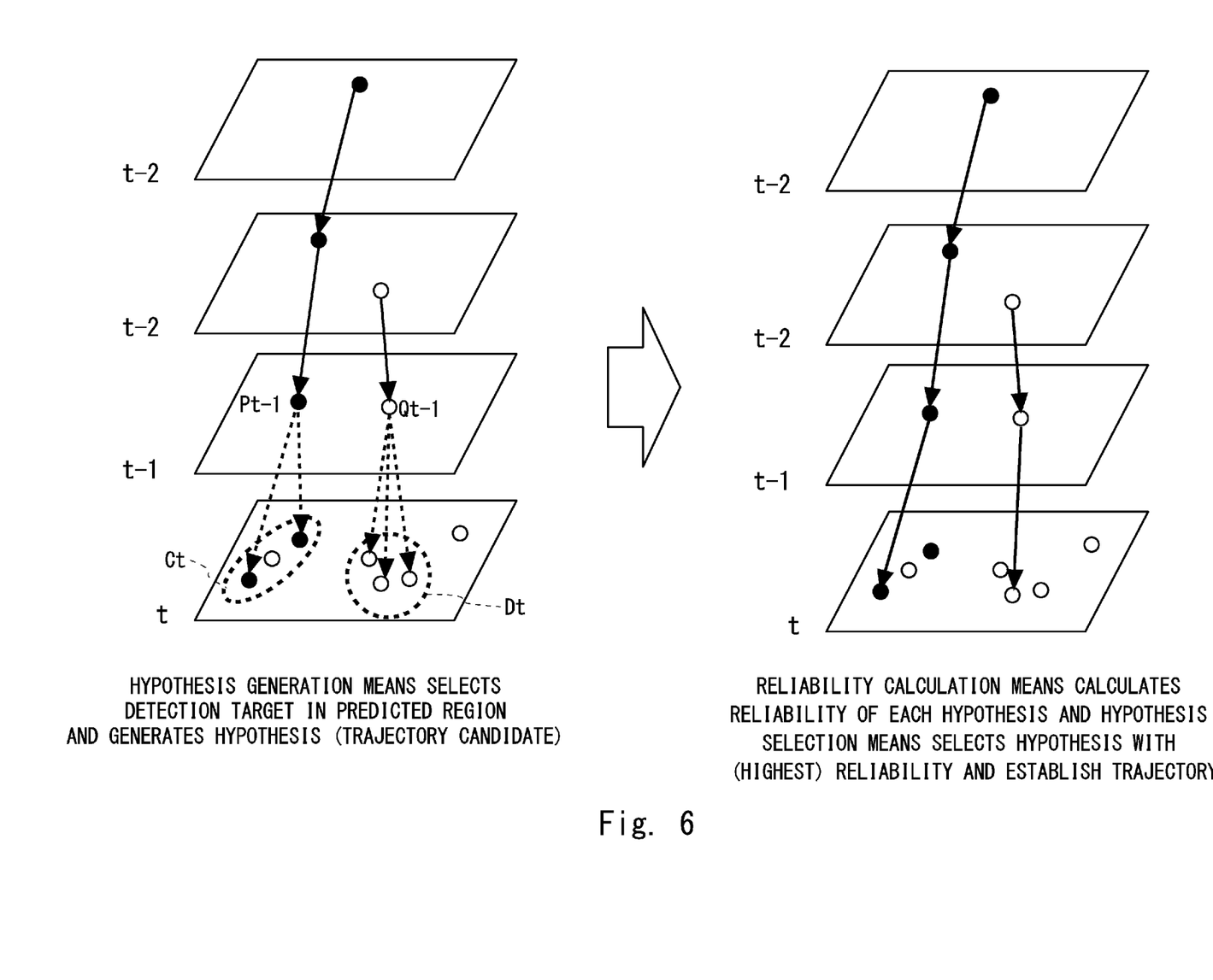
FIG. 6 is a schematic diagram illustrating the operation of hypothesis selection means according to an example embodiment.

The hypothesis selection means 2044 accumulates the reliabilities of the hypotheses in all frames with respect to the reliability of the hypothesis calculated by the reliability calculation means 2043. The hypothesis selection means 2044 selects the hypothesis having the highest accumulated cumulative reliability as the tracking result from the reliabilities of the obtained hypotheses. It should be noted that a predetermined frame may be used instead of all frames.

Here, the operation of the hypothesis selection means 2044 will be described in detail.

FIG. 6 is a schematic diagram illustrating the operation of the hypothesis selection means according to the example embodiment.

The figure on the left side of FIG. 6 shows how the hypothesis generation means 2042 selects detection targets in the predicted region and generates a hypothesis (that is, a trajectory candidate) from these detection targets.

As shown in the figure on the right side of FIG. 6, the hypothesis selection means 2044 selects the hypothesis having the highest reliability among the reliabilities of the hypotheses (trajectory candidates) calculated by the reliability calculation means 2043 as the tracking target trajectory. As a result, the trajectory is established even in the t-th frame. This established trajectory is used as the tracking result.

<Operation>

The operation of the example embodiment will be described.

Figure 7:
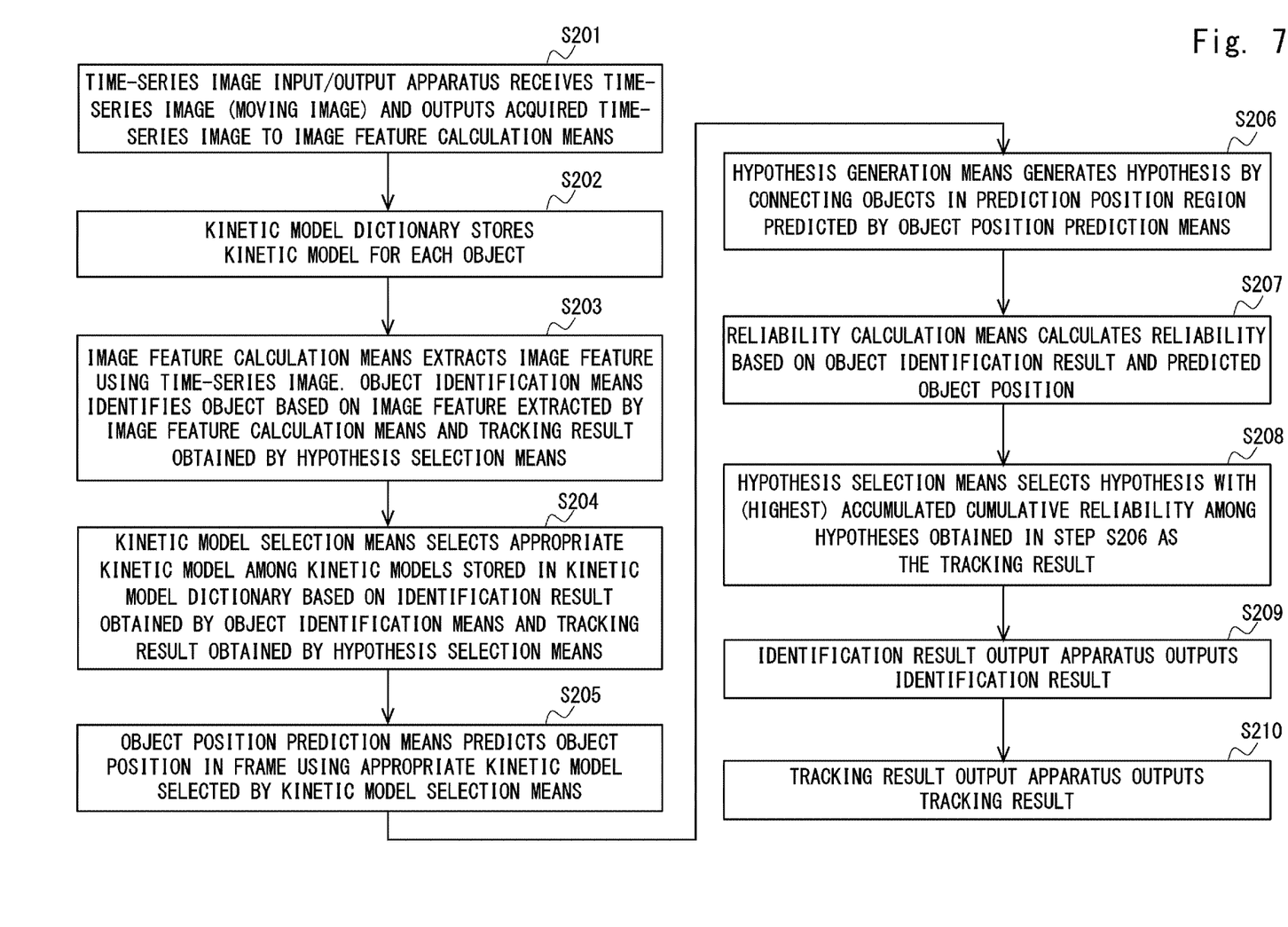
FIG. 7 is a flowchart illustrating the operation of an image processing system according to an example embodiment.

FIG. 7 is a flowchart illustrating the operation of the image processing system according to the example embodiment.

As shown in FIG. 7, the time-series image input/output apparatus 10 receives (acquires) a time-series image (moving image) and outputs the acquired time-series image to the image feature calculation means 201 (step S201).

The kinetic model dictionary 21 stores the kinetic model for each object (step S202).

The image feature calculation means 201 extracts an image feature using the time-series image (step S203a). The object identification means 202 identifies an object based on the image feature extracted by the image feature calculation means 201 and the tracking result obtained by the hypothesis selection means 2044 (step S203b).

The kinetic model selection means 203 selects an appropriate kinetic model among the kinetic models stored in the kinetic model dictionary 21 based on the identification result obtained by the object identification means 202 and the tracking result obtained by the hypothesis selection means 2044 (step S204).

The object position prediction means 2041 predicts the object position in a frame using the appropriate kinetic model selected by the kinetic model selection means 203 (step S205).

The hypothesis generation means 2042 connects the objects (existing) in the prediction position region predicted by the object position prediction means 2041 to generate a hypothesis (step S206).

The reliability calculation means 2043 calculates the reliability from the object identification result and the predicted object position (object position) (step S207).

The hypothesis selection means 2044 selects a hypothesis with the (highest) accumulated cumulative reliability among the hypotheses obtained in step S206 as the tracking result (step S208).

The identification result output apparatus 30 outputs the identification result (step S209).

The tracking result output apparatus 31 outputs the tracking result (step S210).

<Effect>

The effect of the example embodiment will be described.

The image processing apparatus 20 according to the example embodiment includes: the image feature calculation means 201 that outputs an image feature of an object using a time-series image of the object; the object identification means 202 that outputs an identification result obtained by identifying the object using the image feature and a tracking result of the object; the kinetic model selection means 203 that selects an appropriate kinetic model from a plurality of kinetic models based on the identification result and the tracking result; and the object tracking means 204 that tracks the object in time series and calculates the tracking result, from the identified object.

Further, the object tracking means 204 includes: the object position prediction means 2041 that predicts a position of the object in a target frame from a position of the object in a previous frame of the target frame using the appropriate kinetic model; the hypothesis generation means 2042 that generates a candidate for a trajectory of the object as a hypothesis from the predicted position of the object; the reliability calculation means 2043 that calculates a reliability of the object in the identification result as an object reliability, calculates a reliability corresponding to a distance between the predicted position of the object and a detection position of the object in the frame as a movement reliability, and calculates a reliability of the hypothesis by integrating the object reliability and the movement reliability; and the hypothesis selection means 2044 that accumulates the reliability of the hypothesis in a predetermined frame and selects the hypothesis having a highest accumulated cumulative reliability from a plurality of the hypotheses as the tracking result.

Due to the above-mentioned configuration, an image processing apparatus, an image processing system, an image processing method, and a non-transitory computer-readable medium storing an image processing program therein, capable of tracking an object in a video with high accuracy can be provided.

The reason is that, in the example embodiment, the object identification means 202 identifies an object using the image feature calculated (extracted) by the image feature calculation means 201 and the tracking result calculated by the hypothesis selection means 2044. Then, the kinetic model selection means 203 selects an appropriate kinetic model from the plurality of kinetic models stored in the kinetic model dictionary 21 based on the identification result obtained by the object identification means 202 and the tracking result obtained by the hypothesis selection means 2044. In this way, tracking can be performed using an optimum kinetic model according to the type and attribute of the object when performing tracking.

Specifically, if there are two or more tracking targets that have similar movements but have significantly different image features, or if there are two or more tracking targets that have similar image features but have significantly different movements, the tracking targets can be tracked accurately using the example embodiment.

In the above example embodiment, the present invention has been described as a hardware configuration, but the present invention is not limited thereto. The present invention can also realize the processing of each component by causing a CPU (Central Processing Unit) to execute a computer program.

Further, specifically, each apparatus of the image processing system may be realized using a combination of hardware and software. In the form of combining hardware and software, an image processing program is deployed in RAM (Random Access Memory), and hardware such as a control unit (CPU (Central Processing Unit)) is operated based on the program, whereby each unit is realized as various means. Further, the program may be recorded on a recording medium and distributed. The program recorded on the recording medium is read into the memory via wires, wireless, or the recording medium itself to operate the control unit and the like. Examples of the recording medium include optical disks, magnetic disks, semiconductor memory apparatuses, hard disks, and the like.

In the above example embodiment, the program can be stored and supplied to the computer using various types of non-transitory computer-readable media. Non-temporary computer-readable media include various types of tangible storage media. Examples of non-transitory computer-readable media include magnetic recording media (specifically flexible disks, magnetic tapes, hard disk drives), opto-magnetic recording media (specifically opto-magnetic disks), CD-ROM (Read Only Memory), CD-R, CD-R/W, semiconductor memory (specifically, mask ROM, PROM (Programmable ROM), EPROM (Erasable PROM)), flash ROM, and RAM (Random Access Memory). The program may also be supplied to the computer by various types of transitory computer-readable media. Examples of transitory computer-readable media include electrical signals, optical signals, and electromagnetic waves. The transitory computer-readable medium can supply the program to the computer via a wired communication path such as an electric wire and an optical fiber, or a wireless communication path.

Although the invention of the present application has been described with reference to the example embodiments, the invention of the present application is not limited to the above example embodiments. Various changes that can be understood by those skilled in the art can be made within the scope of the invention in the configuration and details of the invention of the present application.

The present invention is not limited to the above example embodiment, and can be appropriately modified without departing from the spirit.

REFERENCE SIGNS LIST

10 TIME-SERIES IMAGE INPUT/OUTPUT APPARATUS
10S IMAGE PROCESSING SYSTEM
20 IMAGE PROCESSING APPARATUS
21 KINETIC MODEL DICTIONARY
201 IMAGE FEATURE CALCULATION MEANS
202 OBJECT IDENTIFICATION MEANS
203 KINETIC MODEL SELECTION MEANS
204 OBJECT TRACKING MEANS
2041 OBJECT POSITION PREDICTION MEANS
2042 HYPOTHESIS GENERATION MEANS
2043 RELIABILITY CALCULATION MEANS
2044 HYPOTHESIS SELECTION MEANS
30 IDENTIFICATION RESULT OUTPUT APPARATUS
31 TRACKING RESULT OUTPUT APPARATUS
Pt-1, Pt BLACK POINT
Qt-1 WHITE POINT
Ct, Ct-1, Dt REGION

What is claimed is:

1. An image processing apparatus comprising:
at least one memory storing instructions, and
at least one processor configured to execute the instructions to:
extract an image feature of an object from a first time-series image of a plurality of time-series images that also include a plurality of subsequent time-series images from a second time-series image through a last time-series image;
identify a type or attribute of the object using the image feature extracted from the first time-series image;
predict an object position of the object in the first time-series image;
track the object through the plurality of subsequent time-series images by, for each time-series image from the second time-series image through the last time-series image:
 selecting, from a plurality of kinetic models, a kinetic model to predict an object position of the object in the time-series image, using the identified type or attribute of the object and the predicted object position of the object in a prior time-series image;
 predicting the object position of the object in the time-series image using the selected kinetic model;
 predict the object position in each subsequent time-series image from a position of the object in a previous time-series image using the selected kinetic model;
 generate a candidate for a trajectory of the object as a hypothesis from the predicted object position of the object;
 calculate an object reliability of the object in an identification result;
 calculate a movement reliability of a distance between the predicted position of the object and a detected position of the object in each time-series image;
 calculate a reliability of the hypothesis by integrating the object reliability and the movement reliability; and
 accumulate the reliability of the hypothesis in each time-series image and select the hypothesis having a highest accumulated cumulative reliability from a plurality of hypotheses as a tracking result.

2. The image processing apparatus according to claim 1, wherein the at least one processor is configured to execute the instructions to predict the object position of the object in the previous time-series image from the object position in each subsequent time-series image.

3. The image processing apparatus according to claim 1, wherein
the at least one processor is configured to execute the instructions to:
calculate a feature vector based on object information comprising an identification result and a tracking result; and
select the kinetic model associated with a feature vector closest to the calculated feature vector among a plurality of feature vectors respectively associated with the plurality of kinetic models.

4. An image processing system comprising:
a time-series image input/output apparatus configured to output a plurality of time-series images that include a first time-series image and a plurality of subsequent time-series images, the plurality of subsequent time-series images including a second time-series image through a last time-series image;
an image processing apparatus configured to receive the plurality of time-series images;
a kinetic model dictionary configured to store a plurality of kinetic models, wherein
the image processing apparatus includes:
at least one memory storing instructions, and
at least one processor configured to execute the instructions to:
extract an image feature of an object from the first time-series image;
identify a type or attribute of the object using the image feature extracted from the first time-series image;
predict an object position of the object in the first time-series image;
track the object through the plurality of subsequent time-series images by, for each time-series image from the second time-series image through the last time-series image:
 selecting, from a plurality of kinetic models, a kinetic model to predict an object position of the object in the time-series image, using the identified type or attribute of the object and the predicted object position of the object in a prior time-series image;
 predicting the object position of the object in the time-series image using the selected kinetic model;

predict the object position in each subsequent time-series image from a position of the object in a previous time-series image using the selected kinetic model;

generate a candidate for a trajectory of the object as a hypothesis from the predicted object position of the object;

calculate an object reliability of the object in an identification result;

calculate a movement reliability of a distance between the predicted position of the object and a detected position of the object in each time-series image;

calculate a reliability of the hypothesis by integrating the object reliability and the movement reliability; and accumulate the reliability of the hypothesis in each time-series image and select the hypothesis having a highest accumulated cumulative reliability from a plurality of hypotheses as a tracking result.

5. An image processing method performed by a computer and comprising:

extracting an image feature of an object from a first time-series image of a plurality of time-series images that also include a plurality of subsequent time-series images from a second time-series image through a last time-series image;

identifying a type or attribute of the object using the image feature extracted from the first time-series image;

predicting an object position of the object in the first time-series image;

tracking the object through the plurality of subsequent time-series images by, for each time-series image from the second time-series image through the last time-series image:

selecting, from a plurality of kinetic models, a kinetic model to predict an object position of the object in the time-series image, using the identified type or attribute of the object and the predicted object position of the object in a prior time-series image;

predicting the object position of the object in the time-series image using the selected kinetic model;

predicting the object position in each subsequent time-series image from a position of the object in a previous time-series image using the selected kinetic model;

generating a candidate for a trajectory of the object as a hypothesis from the predicted object position of the object;

calculating an object reliability of the object in an identification result;

calculating a movement reliability of a distance between the predicted position of the object and a detected position of the object in each time-series image;

calculating a reliability of the hypothesis by integrating the object reliability and the movement reliability; and accumulating the reliability of the hypothesis in each time-series image and select the hypothesis having a highest accumulated cumulative reliability from a plurality of hypotheses as a tracking result.

* * * * *